May 1, 1951  H. C. LINDEMANN ET AL  2,551,144
INTERCHANGEABLE LENS FRAME
Filed June 1, 1949

INVENTORS.
HOWARD C. LINDEMANN
BY ELEANOR L. PEARSON
Nicholas J. Garofalo
ATTORNEY Patented May 1, 1951

2,551,144

UNITED STATES PATENT OFFICE 2,551,144

INTERCHANGEABLE LENS FRAME

Howard C. Lindemann, Great Neck, and Eleanor L. Pearson, Staten Island, N. Y.

Application June 1, 1949, Serial No. 96,437

3 Claims. (Cl. 88—47)

This invention pertains to eyeglass frames, and relates particularly to interchangeable lens frames.

The general object of the invention is an eyeglass frame having split lens frames with the split portions of the lens frames held together by suitable means, whereby the lenses may readily be removed from the lens frames and reinserted in the same or in similar type frames.

The invention is particularly adaptable for use in eyeglass frames of plastics material. Frames of this material now widely in use are made up in various colors. It is not uncommon for many persons, particularly women, to have several sets of variously colored eyeglass frames to match their ensembles. By means of this invention it is possible for a woman to have several sets of various colored lensless frames and a single pair of lenses which she may use interchangeably with the several frames. This interchange of lenses and frames, or the replacement of a broken lens, may be easily made by the wearer without needless expense or the services of an expert.

The lens frames may be split through at the temple sides and the free ends occasioned by the split may be held together by suitable means on the temples, or the lens frames may be split through to the outside across the nose bridge and the free ends resulting from the split may be held together by suitable clamping means about the bridge. In either case the objective of lens frames capable of a ready change of the lenses is achieved.

A more particular object of this invention is, therefore, an eyeglass frame with lens frames split through at the temple sides and provided with suitable means on the temples for holding the free ends of the lens frames together.

A further object of the invention is an eyeglass frame with lens frames split through across the nose bridge to the outside and provided with suitable means for holding the split portions together.

Figure 1:
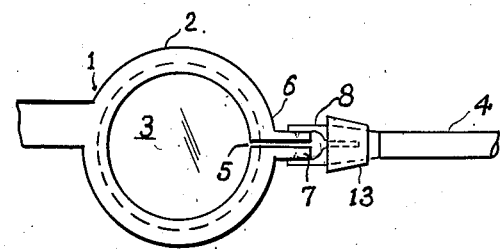
Figures 2, 3:
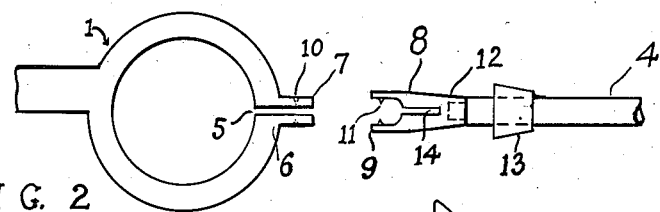
Figures 4, 5:
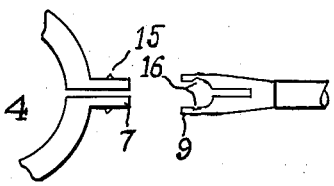
Figure 6:
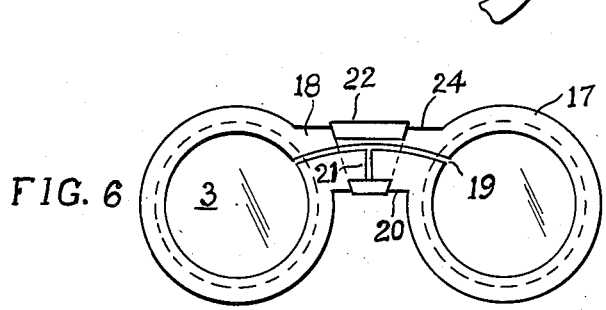
Figure 7:
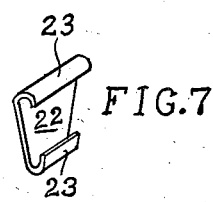
Figure 9:
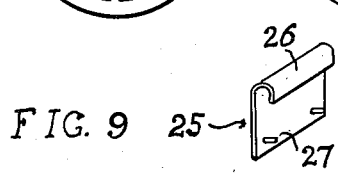
Figure 8:
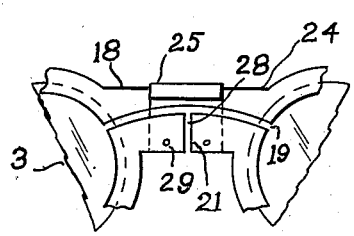
Figure 10:
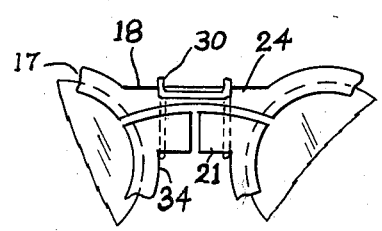
Figure 11:
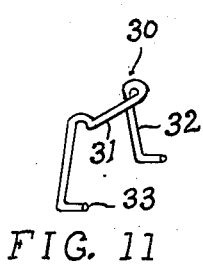

Other objects and advantages of this invention will be apparent from the following detailed description when read in conjunction with the accompanying drawings, wherein, Fig. 1 is a front elevation view of a part of an eyeglass frame embodying a preferred form of the invention, Fig. 2 is an elevation view of the lens frame disconnected from the temple securing means, Fig. 3 is a side elevation view of the lens temple in part, Figs. 4 and 5 are front elevation views of fragments of a lens frame and temple in a modified form of the invention, Fig. 6 is a front elevation view of another modified form of the invention, Fig. 7 is a view of the bridge securing means for the form in Fig. 6, Fig. 8 is a view of another embodiment of a further modified form of the invention, Fig. 9 is a perspective view of the bridge clamp used for the form in Fig. 8, Fig. 10 represents another form of the invention, and Fig. 11 is a view of the bridge securing means for the form in Fig. 10.

In the drawings there is shown a preferred form of the invention as in Figs. 1-3, and there is also illustrated in the other figures several variations of the invention.

Referring to the drawings, particularly Figs. 1-3 there is shown in a part of an eyeglass frame 1 a lens frame 2. The lens is adapted to contain a lens 3. Associated with the lens frame 2 is a temple 4. At its temple side the lens frame 2 contains a separation or split 5 through to the outside. Such splitting of the lens frame enables the free ends 6 formed by the split to be spread apart, thereby allowing insertion or removal of a lens from the frame. The free ends 6 terminate in ears 7. It can be seen that after a lens 3 has been inserted into the lens frame such lens may be held securely in the frame by drawing the two ears 7 together.

The temple 4 is provided with suitable means at one end, such as a C clamp 8. This clamp is adapted to receive and hold clamped between its jaws 9 the lens frame ears 7. The ears 7 have in their outer surfaces dimples or indentions 10. These indentions serve to receive tits or nubs 11 positioned on the inner faces of the C clamp jaws 9. Such jaws are tensioned at their nub ends slightly inward toward each other, so as to permit a force fit or clamping effect when the ears 7 are pressed in between such jaws. The C clamp 8 may be an integral part of the temple 4 or a separable unit attached to the temple. Where the clamp 8 is a separable unit, as here, it is preferably of spring metal with a terminal sleeve 12 adapted to be force fitted onto one end of the temple 4. The clamping effect of the jaws 9 on the lens frame ears 7 is sufficient to hold them on to the lens frame ears 7, however, added means may be provided to more securely hold such jaws in clamped position. A compression sleeve 13 is provided for this purpose. It is to be noted that the terminal sleeve 12 has a slot 14 at one end opening into the space between the jaws 9. This sleeve 13 is adapted to slide snugly about the slotted portion 14 of the terminal sleeve 12, and thereby to compress and hold the jaws 9 in clamped position on the ears 7. An advantage of the sleeve 13 is its added protection against the jaws 9 being accidentally knocked from the ears 7, which event is possible in cases where such compression sleeve is not employed. The temple 4, through means of the C clamp terminal 8 having its nubs 11 pivotable in the ear dimples 10, is enabled to swing sideways in hinge fashion on the lens frame ears.

It is understood that the eyeglass frame 1 comprises a pair of lens frames 2, and that only one of them is shown and described here since both are identical in structure.

In the use of this invention the free ends 6 occasioned by the split lens frame are drawn apart sufficiently to permit insertion of a lens 3 into the frame 2. It is understood that the lens frame 2 is provided with suitable means such as a groove into which the lens 3 may be inserted. After a lens is inserted into the lens frame the ears 7 of the free ends 6 are drawn together and the jaws 9 of the temple clamp 8 are clamped over such ears with the nubs 11 pivotable in the ear dimples 10. The temple compression sleeve 13 is then drawn over the slotted portion 14 of the C clamp where it holds the jaws 9 securely in clamped position onto the lens frame ears 7.

In the modified form of the invention shown in Figs. 4 and 5 the nubs 15 on the lens frame ears 7 and the indentions 16 in the inner faces of the C clamp jaws 9 are reversed to those shown in Fig. 1.

Now, as stated earlier, the splitting of the lens frames, as in the modified forms of the invention in Figs. 6-11, may be made through the lens frames across the nose bridge to the outside of the frame, and the free ends resulting from the split may be supportedly held together by a suitable bridge clamp.

In these modified forms the lens frames 17 are split through across the nose bridge 18 to the outside. The bridge split 19 assumes the form of a T as in Figs. 6, 8, and 10. The split 19 is transversely across the bridge 18 and through both lens frames 17. The split 19 is also centrally of the bridge to the outside of the lower horizontal side 20 of the nose bridge. The free ends 21 of the lens frames occasioned by the split are supportedly held together by means of a suitable nose bridge clip or clamp. This bridge clamp may take several forms as in Figs. 7, 9, and 11. Each particular form has its own individual advantages. The several bridge clamps shown are of tensile material, preferably metal.

The means shown in Fig. 7 for supporting the lens frame free ends 21 is in the nature of a C clamp 22. The two opposed ends 23 of this clamp are curved inwardly towards each other. These curved portions are adapted as in Fig. 6 to clamp over the horizontal upper side 24 and the lower horizontal side 20 of the nose bridge 18. When the clamp 22 is in position about the bridge 18 the lens frame free ends 21 will be securely contained within the C clamp curved ends 23, and the lenses 3 inserted in a conventional groove of the lens frames will be securely held therein.

A variation of the bridge clamp is shown in Fig. 9. There is a bridge clamp 25 curved or hooked at 26. Toward the bottom of the clamp opposed to the hooked portion 25 are two projecting pins 27. In the lens frame free ends 21 on either side of the central portion 28 of the split 19 are holes 29. These holes are adapted to receive the projecting pins 27. In assembling such bridge clamp onto the bridge 18 after lenses 3 have been inserted into the lens frames 17, the projecting pins 27 are first inserted into the holes 29 and the curved portion 26 is then pressed or snapped into position over the upper horizontal side 24 of the nose bridge 18.

Another variation of the bridge clamp is illustrated in Fig. 11. There is shown a flexible wire clamp 30 with a hooked portion 31 adapted to clamp over the upper side 24 of the bridge 18. Depending from the hooked portion 31 are two legs 32. At the free ends of such legs are projecting feet or hooks 33. The legs 32 spread apart slightly when released from the nose bridge as in Fig. 11. The distance of the spread of the legs is slightly greater than the distance between the two lens frames 17. The leg hooks 33 are adapted to limit against the sides 34 of the lens frames and immediately beneath the lens frame free ends 21, as in Fig. 10. In assembling the modified form 30 of the clamp to the nose bridge 18, the depending legs 32 are manually drawn together and then are released beneath the free ends 21 of the lens frames where they will limit against the lens frame sides 34. The hooked portion 31 is then clamped or pressed over the upper edge 24 of the bridge.

The various supporting clamps used, whether they be about the nose bridge or on the temples, not only secure the free ends of the lens frames together, but also clamp about such ends and tension them upwards so as to secure a lens within the lens frames.

Through means of the split lens frames and the various types of clamps used to support the free ends occasioned by the split frames, it can well be seen that a lens may readily be removed from the lens frame simply by removing the clamp, and also that a lens may readily be re-inserted in the lens frame and securely retained therein by means of the clamp about the free ends of the lens frames.

This invention in its preferred form as well as in its various modifications is adapted for use particularly with frames of plastic material.

Having described the principle of the invention and a preferred form thereof, it is our intent to claim all such forms and modifications of the invention as may reasonably be construed to be within the spirit of the invention and within the scope of the appended claims.

We claim:

1. The combination with an eyeglass lens frame adapted to receive interchangeable lenses, having a split through the lens frame to the outside at the temple joining side for allowing a separation of the lens frame for replacement of the lenses and having ears extending from the free ends of the split lens frame, the ears containing indentations in their outer surfaces, of a temple element comprising an elongated member, a separable C clamp element of tensile material at one end of the temple elongated member, the C clamp having a terminal sleeve portion in which the one end of the temple elongated member is contained, a pair of jaws extending from the terminal sleeve portion and a pair of nubs on the inner marginal surfaces of the jaws, the indentations of the lens frame ears being adapted to receive the nubs of the C clamp jaws for pivotal side movement of the temple element, the terminal sleeve portion having a slot at its jaw end in communication with the space between the C clamp jaws, and a compression sleeve carried for slideable movement on the temple element, the compression sleeve being adapted to slide over the slotted portion of the C clamp terminal sleeve whereby C clamp jaws may be drawn together and held clamped upon the ears of the lens frame.

2. In a plastic eyeglass frame of the character described adapted to receive interchangeable lenses, a lens frame provided with a split through to the outside at the temple joining side allowing a separation of the lens frame for replacement of the lenses, ears projecting from the free ends of the split lens frame, a temple bar, a spring metal C clamp having a pair of extended jaws and affixed to the joining end of the temple bar, pivot pins on the inner marginal faces of the C clamp jaws, indentations in the outer surfaces of the projecting ears containing therein the pivot pins of the C clamp jaws, and a compression sleeve adapted for slideable movement on the temple bar and compressing such jaws on the lens frame ears.

3. In an eyeglass frame of the character described adapted to receive interchangeable lenses, the combination of a pair of lens frames, each lens frame being split through to the outside at the temple joining side for allowing a separation of the lens frames for replacement of the lenses, a pair of opposed ears extending from the free ends of each lens frame, indentations in the outer surfaces of the ears, a pair of temples, a C clamp element of tensile material carried on one end of each temple, the C clamp element having a terminal sleeve portion carried on the said temple end, a pair of opposed jaws extending from the terminal sleeve portion and a pair of nubs on the inner surfaces of the jaws, the indentations of the ears being adapted to receive the said nubs for pivotal side movement of the temples, the C clamp element having a slot in its jaw end communicating with the space between the jaws, and a pair of slideable compression sleeves one fitting about the slotted portion of the terminal sleeve of each C clamp whereby the C clamp jaws are held clamped in the indentations of the lens frame ears.

HOWARD C. LINDEMANN.
ELEANOR L. PEARSON.

REFERENCES CITED

The following references are of record in the file of this patent:

UNITED STATES PATENTS

| Number | Name | Date |
|---|---|---|
| 26,444 | Peckham | Dec. 13, 1859 |
| 96,387 | Black | Nov. 2, 1869 |
| 780,470 | Baker | Jan. 17, 1905 |
| 1,171,895 | Shindel | Feb. 15, 1916 |
| 1,272,833 | Metcalf | July 16, 1918 |
| 1,284,071 | Dorney | Nov. 5, 1918 |
| 1,845,582 | Courtright | Feb. 16, 1932 |
| 1,922,766 | Hurwitz | Aug. 15, 1933 |
| 2,154,382 | Lindblom | Apr. 11, 1939 |
| 2,169,235 | Foster | Aug. 15, 1939 |
| 2,380,281 | Whipple | July 10, 1945 |
| 2,473,619 | Tolobre | June 21, 1949 |

FOREIGN PATENTS

| Number | Country | Date |
|---|---|---|
| 574,837 | France | Apr. 7, 1924 |